June 30, 1953 — I. NESSON — 2,643,411
WIPER BLADE CONNECTOR
Filed June 14, 1951
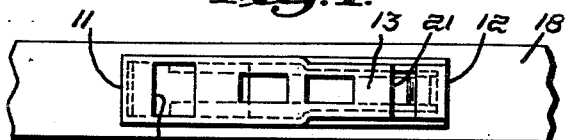
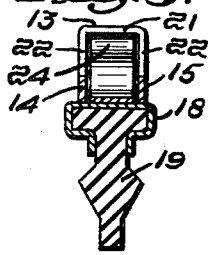
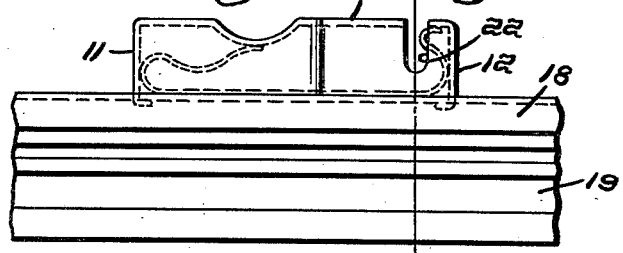
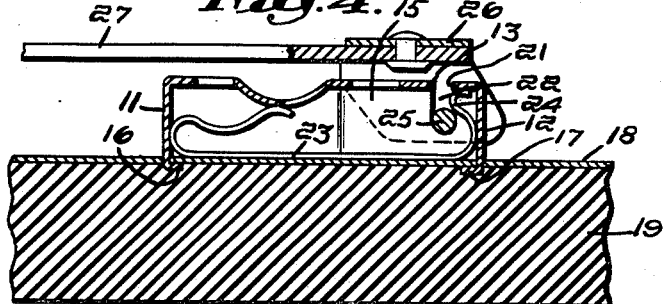
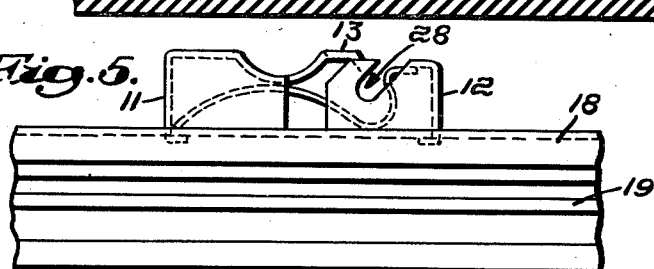
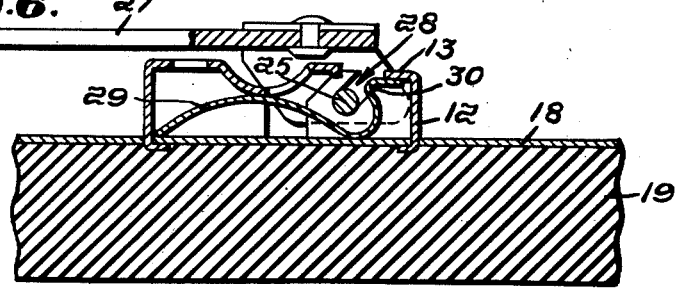
Inventor:
Israel Nesson,
by Shmoom & Shmoom
Attorneys Patented June 30, 1953

2,643,411

UNITED STATES PATENT OFFICE 2,643,411

WIPER BLADE CONNECTOR

Israel Nesson, Lynn, Mass., assignor to Max Zaiger, Swampscott, Mass.

Application June 14, 1951, Serial No. 231,529

2 Claims. (Cl. 15—250)

This invention relates to connectors or clips applied to windshield wiper blades for separably attaching the end of the oscillating windshield wiper arm to the blade, and this application is a continuation in part of my application for wiper blade clip, Serial No. 72,569, filed January 25, 1949.

My said application relates to a simple and economical form of connector, involving a spring element and so constructed that it will receive and resiliently retain the free end of several standard types of wiper arm which may be selectively connected to the wiper blade by the use of the improved clip.

The subject matter of the present application is directed specifically to the use of the aforesaid connector in separably and pivotally attaching to a wiper blade a wiper arm having a cross pin or cross bar adjacent its free end. The principal object of this invention is to provide a box-like connector or clip, suitably fastened to the back of the wiper blade and having communicating slots in its top and sides for receiving said cross pin or bar, and provided with an enclosed spring member having a latch element resiliently engaging the applied cross bar for releasably locking the bar in the side slots of the connector.

Recommended embodiments of the invention, as shown in certain of the figures of the drawings of my aforesaid co-pending application are illustrated in the accompanying drawings, but it will be understood that the structural details of the connectors shown and described herein may be varied without departing from the essence of this invention as defined in the appended claims.

In the drawings,

Fig. 1 is a fragmentary plan view of a wiper blade with a preferred form of the improved connector attached thereto;

Fig. 2 is a side elevation of Fig. 1;

Fig. 3 is a transverse section of line 3—3 of Fig. 2;

Fig. 4 is a central longitudinal section through the wiper blade and the attached connector, indicating the manner in which the end of a pin-type wiper arm is removably attached to the connector;

Fig. 5 is a view similar to Fig. 2 showing a modified form of connector; and

Fig. 6 is a central longitudinal section through the blade and clip of Fig. 5.

In the particular embodiment chosen for the purpose of illustration in Figs. 1 to 4, the improved connector comprises a box-like member, preferably made in one piece by stamping and bending a metal sheet to form a connector or clip having ends 11 and 12, a top generally indicated at 13, and sides 14 and 15. It will be understood that the sides and ends of the clip may be bent downwardly from the top part to form the box-like structure. The ends 11 and 12 are respectively provided with bottom tabs 16 and 17 which pass through and are crimped beneath suitable openings in the metal shell or backing 18 of the wiper blade 19, to secure the connector to the blade; but other means of fastening the parts together may obviously be provided. It will also be understood that the flexible rubber wiper blade 19 may be of any desired form or configuration and may be held in the shell or backing 18 in any desired manner, inasmuch as the particular structure of these elements is immaterial to this invention.

The top of the connector is provided with openings 20 and 21 respectively, and the transverse opening 21 adjacent the end 12 communicates with downwardly extending notches or slots 22, disposed substantially parallel to the end 12. The opening 20 is not material to the present invention, and the top 13 may have additional openings for the purposes explained in my previous application, in attaching other types of wiper arm ends to the connector.

A leaf spring 23 is disposed within the box-like connector with its central portion bearing on the blade shell 18, has upwardly curved portions engaging the inner surfaces of the end walls 11 and 12, respectively.

One end portion of the spring curves upwardly and terminates in a reverse bight 24 the extremity of which normally engages a portion of the top 13, with the bight projecting into the space between the notches 22, to provide a resilient latch element for retaining in said slots the cross pin or bar 25 extending between the sides of a terminal piece 26 fastened to the end of the wiper arm 27. It will be understood that the wiper arm end may be suitably provided with various types of transverse pins or bars which may be inserted through the top slot 21 and into the side notches 22, and retained in said notches by the latch element 24 of the spring 23. It is apparent that the latch will yield upon insertion of the pin 25, and will then spring back to normal position where it obstructs accidental removal of the pin from the slots 22; but that the pin may be manually released from said engagement whenever desired by retracting it from the slots 22 and through the transverse opening 21 in the top of the connector.

The bottoms of the slots 22 are preferably curved or rounded, as shown, so that the bar 25 will pivot smoothly therein during operation of the windshield wiper. As is well understood, wiper arms are spring-pressed toward the windshield for effective wiping action of the blade. Such arm pressure holds the cross pin or bar at the bottoms of said slots for such pivotal movement.

In the modified form shown in Figs. 5 and 6, the connector structure is similar to that previously described, except that the side slots 28 are inclined away from the end wall 12 of the connector, and that the spring 29 bears upon the blade shell 18 adjacent its end portions and has an upwardly bowed center portion engaging a downwardly curved portion of the connector top 13. Spring 29 has a reverse bight 30 constituting a latch element which cooperates with the notches or slots 28 to prevent accidental displacement of the inserted cross pin or bar 25, in substantially the same manner as the latch element 24 of the previous embodiment. The cross pin or bar adjacent the end of the wiper arm 27 is inserted and removed as previously explained.

It will be observed, particularly in Fig. 6, that the spring latch 22 or 30 need not directly engage the cross bar of the applied arm end. During operation of the wiper, the pressure of the spring-actuated wiper arm maintains the cross bar in the bottoms of the connector slots, as previously explained, thereby tending to obviate noise or chattering between the connected parts while the blade is moved across the windshield by reciprocation of the arm in the conventional manner. The spring latch affords a simple, convenient and effective retaining means for preventing accidental detachment of the arm when the wiper is not in operation; for example, when the arm is manually lifted away from the windshield to clean the glass or for other purposes.

I claim:

1. A connector attached to a windshield wiper blade for removably connecting thereto a wiper arm having a cross bar adjacent its free end, the connector having a top, sides, and ends, the top having a transverse opening adjacent one end of the connector and side slots communicating with said opening and adapted to receive a cross bar inserted through said opening and into said slots, and a flat, elongate spring disposed within the connector, said spring having a portion bearing on the wiper blade and a curved latch portion extending toward the top of the connector and operatively associated with said side slots for releasably retaining said cross bar in said slots.

2. A connector as described in claim 1, said latch portion consisting of a reverse bight adjacent one end of said spring, the extreme end of said bight bearing against the under surface of the top of the connector adjacent said connector end.

ISRAEL NESSON.

References Cited in the file of this patent

UNITED STATES PATENTS

| Number | Name | Date |
|---|---|---|
| 2,432,693 | Anderson | Dec. 16, 1947 |

FOREIGN PATENTS

| Number | Country | Date |
|---|---|---|
| 524,235 | Great Britain | Aug. 1, 1940 |